June 14, 1932. A. EILERSGAARD 1,862,888
OVERLOAD RELEASE
Filed July 18, 1930
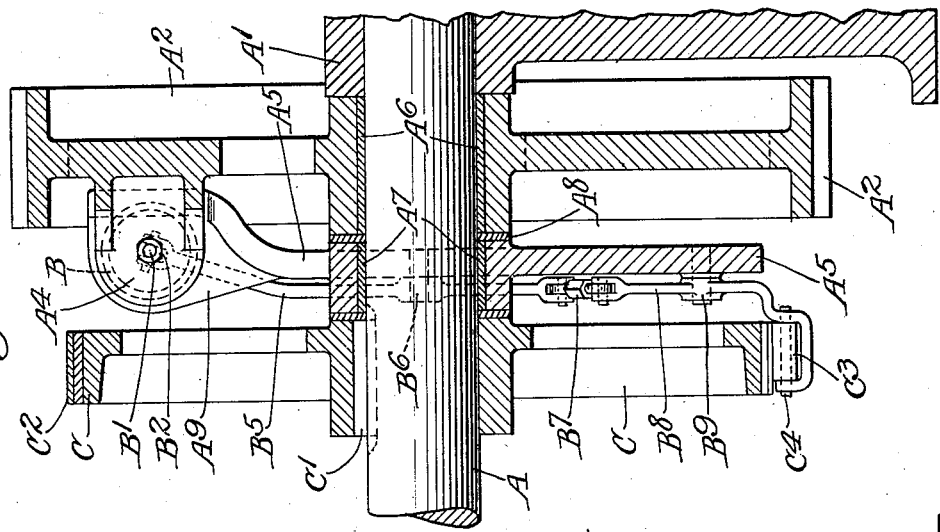
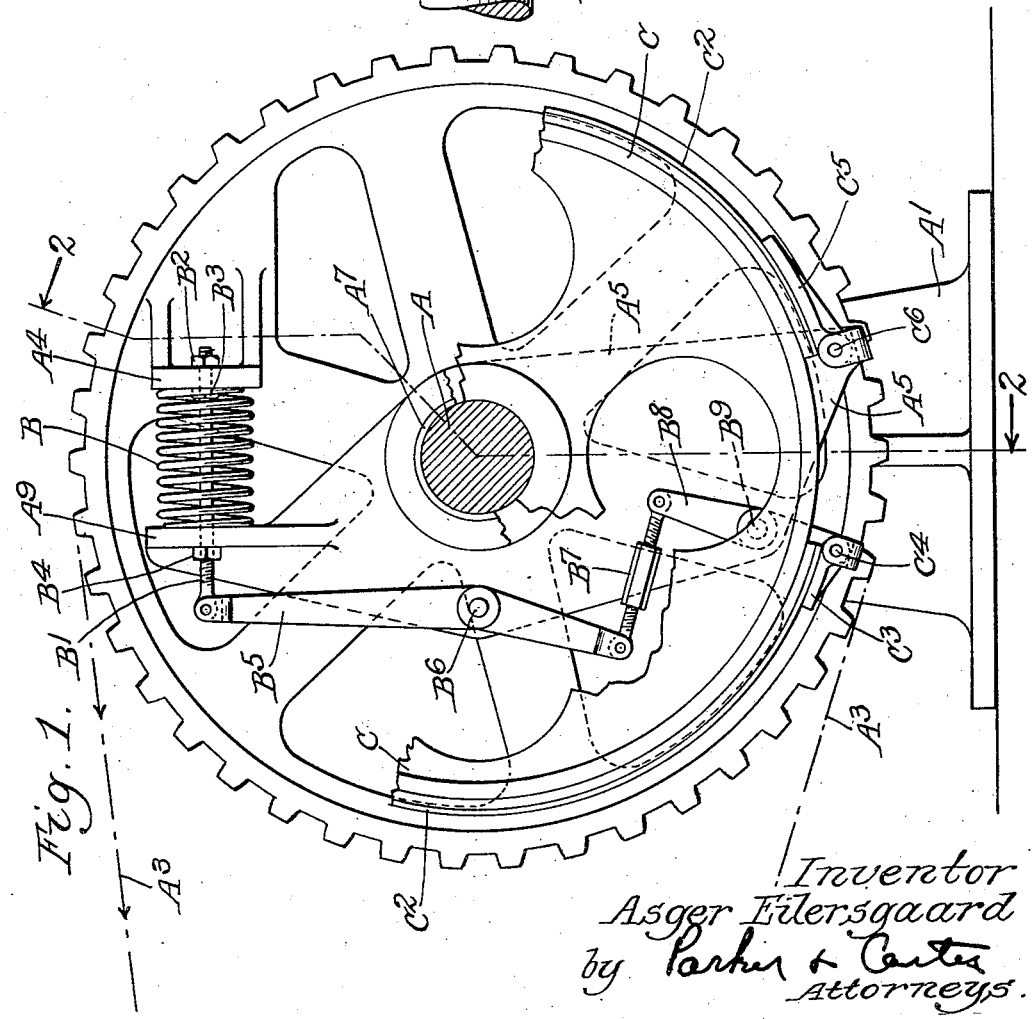
Inventor
Asger Eilersgaard
by Parker + Carter
Attorneys.

Patented June 14, 1932

1,862,888

UNITED STATES PATENT OFFICE

ASGER EILERSGAARD, OF CHICAGO, ILLINOIS, ASSIGNOR TO LINK-BELT COMPANY, OF CHICAGO, ILLINOIS, A CORPORATION OF ILLINOIS

OVERLOAD RELEASE

Application filed July 18, 1930. Serial No. 468,852.

My invention relates to improvements in overload releases and has for one object to provide a new and improved form of overload release or safety clutch which will let go automatically when the torque exceeds a predetermined point and will again take hold automatically to give substantially positive driving relation as soon as the torque drops to a desired or preadjusted maximum. Other objects will appear from time to time throughout the specification and claims.

My invention is illustrated more or less diagrammatically in the accompanying drawing, wherein—

Figure 1 is a side elevation;

Figure 2 is a section along the line 2—2 of Figure 1.

Like parts are indicated by like characters throughout the specification and drawing.

A is a driven shaft. It is supported on bearings $A^1$ and as shown is a characteristic drive shaft which may be used for line shafting or to drive any other kind of machinery. $A^2$ is a driving wheel or pulley mounted loosely upon the shaft A and free to rotate with respect thereto but held against longitudinal displacement therealong. This driving wheel is driven by a belt $A^3$ from any suitable source of power not here shown and it will be understood that the driving wheel $A^2$ might be driven by a chain, spur gears, worm gear, toothed gear or any other suitable means for transmitting power from a prime mover or other source of power to the driving wheel or pulley or it may be mounted directly on the power shaft or crank shaft of the prime mover. Projecting laterally from one side of the driving wheel is the lug or abutment $A^4$. It will be understood that when I say the pulley $A^2$ is loosely mounted free to rotate on the shaft, I am referring to its own upper mounting on the shaft. The pulley is of course connected to the shaft for driving by the release mechanism about to be described. $A^5$ is a release disc. It also is loosely mounted and free to rotate on the shaft, in the same way as the driving wheel $A^2$. The parts $A^2$ and $A^5$ being associated with bearing sleeves $A^6$ $A^7$ upon which they are mounted for rotation on the shaft and being spaced one from another by a bearing ring $A^8$. The release disc has a lug $A^9$ in opposition to the lug $A^4$ on the driving wheel $A^2$.

B is a compression spring adapted to be compressed between the two lugs $A^4$ and $A^9$ and guided by a guide pin $B^1$ passing through the two lugs and through the center of the spring. Nuts $B^2$ $B^3$ threaded on one end of the guiding pin hold it firmly in position in the lug $A^4$. It is free to slide through the lug $A^9$. A nut $B^4$ threaded on the pin and engaging the lug $A^9$ holds the spring in initial compression between the two lugs $A^4$ and $A^9$ which are held together by the guide pin with the spring between them. Thus nut $B^4$ may be adjusted to change the initial compression in the spring and thereby as will hereinafter appear, to adjust the amount of load which may be transmitted before release takes place. $B^5$ is a transmission lever. It is pivoted at $B^6$ on the release disc $A^5$. One end is pivoted on the pin $B^1$, the other end has pivoted thereon an adjustable connecting link $B^7$, the other end of which is pivoted on a brake lever $B^8$, the brake lever in turn being pivoted at $B^9$ on the release disc $A^5$.

C is a clutch wheel rigidly mounted on the shaft A by means of the key $C^1$. Encircling it is a brake or friction band $C^2$. This band is supported at one end by the live end lug $C^3$ which is pivoted on the live end pin $C^4$ on the brake lever $B^8$. This band encircles or substantially encircles the wheel C and is supported at its other end on the dead end lug $C^5$ pivoted on the dead end pin $C^6$ on the release disc $A^5$.

Starting with the parts shown in position as in Figure 1, the pressure exerted by the coil spring B tending to separate the lugs $A^4$ and $A^9$ holds the nut $B^4$ firmly against the back side of the lug $A^9$. The lever $B^5$ is thus held in fixed position. The shackle $B^7$ can be adjusted to rotate the lever $B^8$ with respect to the fixed lever $B^5$ to cause the live end lug to move toward the dead end lug and so constrict the friction band upon the clutch wheel to give the driving effect, the release disc, its lever system, the clutch wheel and the friction or clutch band being all locked together in driving relation. The drive between the release disc and the driving wheel being taken care of by the pre-compressed release spring. If the resistance encountered by the shaft is so great that the pressure between the lugs $A^4$ and $A^9$ exceeds the resisting power of the spring, these two lugs compressing the spring between them will approach one another, thus moving the pin $B^1$ to the left rotating the transmission lever $B^5$ in a counter clockwise direction, thus causing the shackle $B^7$ to rotate the clutch lever $B^8$ in a clockwise direction to separate the dead end and live end lugs and thereby release the tension of the clutch band on the clutch wheel permitting it to slip on the wheel so that the shaft will no longer be driven. This situation will continue until the resistance to rotation of the shaft drops to a point at which the spring will again separate the lugs to bring the nut $B^4$ against the lugs $A^9$ when normal drive will be resumed.

It does not of course necessarily follow that the shaft will have to stop altogether but this may actually happen and in any event when the resistance to rotation of the shaft exceeds the desired point, the relation of the parts is such that the approach of the two lugs $A^4$ and $A^9$ compressing the spring, rotates the levers to release the clutch band to the extent that it may slip on the clutch wheel, thus preventing overload.

I claim:

1. An overload release comprising a driving wheel and a driven member, a clutch interposed between them, a spring interposed between them through which power is transmitted, means for adjusting the initial resistance of the spring, and a connection between the spring and the clutch whereby when the spring is loaded beyond its initial adjustment the clutch is released and means for adjusting said connection.

2. An overload release comprising a driving wheel, a driven member, a clutch and a release member interposed between them, yielding means interposed between the driving member and the release member, and means for adjusting the initial load upon the yielding means and a linkage carried by the release member operable responsive to overload on the yielding means for releasing the clutch.

3. An overload release comprising a shaft, a driving wheel and a release disc both rotatably mounted thereon and a clutch wheel keyed thereon, a spring interposed between the release disc and the driving wheel, means for adjustably giving it an initial load, a clutch member associated with the clutch wheel and adjustable means associated with the release disc and responsive to flexing of the spring beyond its initial point for releasing the clutch.

4. An overload release comprising a shaft, a driving wheel and a release disc both rotatably mounted thereon and a clutch wheel keyed thereon, a spring interposed between the release disc and the driving wheel, means for adjustably giving it an initial load, a clutch member associated with the clutch wheel and means associated with the release disc and responsive to flexing of the spring beyond its initial point for releasing the clutch, said means comprising a clutch lever, a transmission lever and adjustable means between the two levers.

5. An overload release comprising a shaft, a driving wheel and a release disc both rotatably mounted thereon and a clutch wheel keyed thereon, a spring interposed between the release disc and the driving wheel, means for adjustably giving it an initial load, a clutch member associated with the clutch wheel and means associated with the release disc and responsive to flexing of the spring beyond its initial point for releasing the clutch, said means comprising a clutch lever, a transmission lever, and adjustable means between the two levers, and a guide pin rigidly mounted at one end on the driving wheel associated with the spring, adapted when the spring is loaded and the driving wheel and release member are moved relatively to cause rotation of the transmission lever to actuate the clutch.

6. An overload release comprising a shaft, a driving wheel and a release disc both rotatably mounted thereon and a clutch wheel keyed thereon, a spring interposed between the release disc and the driving wheel, means for adjustably giving it an initial load, a clutch member associated with the clutch wheel and means associated with the release disc and responsive to flexing of the spring beyond its initial point for releasing the clutch, said means comprising a clutch lever, a transmission lever, and adjustable means between the two levers, and a guide pin rigidly mounted at one end on the driving wheel associated with the spring, adapted when the spring is loaded and the driving wheel and release member are moved relatively to cause rotation of the transmission lever to actuate the clutch, the clutch comprising a band clutch dead ended at one end on the release member, there being a live connection between the other end of the clutch and the driving member.

7. An overload release comprising a driving wheel and a release disc, a shaft upon which they are both rotatably mounted, a clutch wheel keyed upon the shaft, opposed lugs on the driving wheel and the release member, a compressible spring interposed between them, guide means for the spring and means associated therewith for adjusting the initial compression of the spring, a clutch band associated with the clutch wheel adapted to be released when the levers are rotated and means in the lever system for initially adjusting the tension of the clutch band.

8. An overload release comprising a driving member and a driven member, a clutch interposed between them, abutments associated with the clutch and the driving member, a spring interposed between the abutments and adapted to yield under load to permit relative movement of the abutments, means for adjusting the initial tension of the spring, a linkage interposed between the abutments and the clutch adapted to operate the clutch responsive to relative movement of the abutments.

9. An overload release comprising a driving member and a driven member, a clutch interposed between them, abutments associated with the clutch and the driving member, a spring interposed between the abutments and adapted to yield under load to permit relative movement of the abutments, means for adjusting the initial tension of the spring, a linkage interposed between the abutments and the clutch adapted to operate the clutch responsive to relative movement of the abutments, the linkage being adjustable in consonance with the spring adjustment.

10. An overload release comprising a driving member and a driven member, a clutch interposed between them, abutments associated with the clutch and the driving member, a spring interposed between the abutments and adapted to yield under load to permit relative movement of the abutments, means for adjusting the initial tension of the spring, a linkage interposed between the abutments and the clutch adapted to operate the clutch responsive to relative movement of the abutments, the linkage being adjustable in consonance with the spring adjustment, and separately adjustable independent of the spring adjustment.

Signed at Chicago, county of Cook, and State of Illinois, this 26th day of June, 1930.

ASGER EILERSGAARD.